(12) United States Patent
Buter et al.

(10) Patent No.: US 8,017,686 B2
(45) Date of Patent: Sep. 13, 2011

(54) POLYURETHANE DISPERSANT RESIN

(75) Inventors: Roelof Buter, Dieren (NL); Josephina Johanna Hendrika Maria Raben-Schlief, Wehl (NL); Hendrik Meijer, Hazerswoudedorp (NL); Geertje Marte Kuiken, Leiden (NL); Rienk Hettema, Sassenheim (NL); Jamie MacLiver Roy, Leiden (NL); Bart Bouma, Valkenburg (NL)

(73) Assignee: Akzo Nobel Coating International B.V., Arnhem (NL)

( * ) Notice: Subject to any disclaimer, the term of this patent is extended or adjusted under 35 U.S.C. 154(b) by 115 days.

(21) Appl. No.: 12/064,562

(22) PCT Filed: Aug. 21, 2006

(86) PCT No.: PCT/EP2006/065501
§ 371 (c)(1),
(2), (4) Date: Apr. 11, 2008

(87) PCT Pub. No.: WO2007/023145
PCT Pub. Date: Mar. 1, 2007

(65) Prior Publication Data
US 2008/0214729 A1    Sep. 4, 2008

Related U.S. Application Data

(60) Provisional application No. 60/712,122, filed on Aug. 30, 2005, provisional application No. 60/749,041, filed on Dec. 12, 2005.

(30) Foreign Application Priority Data

Aug. 23, 2005 (EP) .................................... 05107724
Oct. 4, 2005 (EP) .................................... 05109205

(51) Int. Cl.
*C08G 18/08* (2006.01)
*C08G 18/00* (2006.01)
*C08K 3/20* (2006.01)
*C08L 75/00* (2006.01)

(52) U.S. Cl. ........................... 524/591; 524/589; 528/44

(58) Field of Classification Search ................... 524/589, 524/591; 528/44; 522/181, 59; 526/328
See application file for complete search history.

(56) References Cited

U.S. PATENT DOCUMENTS

| | | | |
|---|---|---|---|
| 3,905,929 A | | 9/1975 | Noll |
| 4,426,492 A | * | 1/1984 | Steckler .......................... 525/61 |
| 4,794,147 A | * | 12/1988 | Savino et al. .................. 525/127 |
| 5,466,772 A | * | 11/1995 | Angelmayer et al. ........... 528/73 |
| 5,548,005 A | * | 8/1996 | Kurth et al. .................... 523/414 |
| 5,589,534 A | * | 12/1996 | Metzger et al. ................ 524/548 |
| 7,268,203 B2 | | 9/2007 | Bruchmann et al. |
| 2002/0165313 A1 | | 11/2002 | Tanzer et al. |
| 2004/0058181 A1 | * | 3/2004 | Garnault et al. ........... 428/539.5 |
| 2004/0097685 A1 | * | 5/2004 | Bruchmann et al. ............. 528/44 |
| 2004/0260013 A1 | * | 12/2004 | Richards ....................... 524/589 |

FOREIGN PATENT DOCUMENTS

| | | |
|---|---|---|
| DE | 1 795 662 | 1/1973 |
| DE | 101 16 767 | 10/2002 |
| GB | 1069735 | 4/1967 |
| WO | WO 97/19120 | 5/1997 |
| WO | WO 99/41320 | 8/1999 |
| WO | WO 01/48106 | 7/2001 |
| WO | WO 03/046038 | 6/2003 |
| WO | WO 03/087183 | 10/2003 |

OTHER PUBLICATIONS

European Standard ISO 862, "Surface Active Agents—Vocabulary—Trilingual," Aug. 1995.
Search Report, European Application No. EP 05 10 7724, dated Apr. 18, 2006.
PCT International Search Report, International Application No. PCT/EP2006/065501, dated May 14, 2007.

* cited by examiner

*Primary Examiner* — Mark Eashoo
*Assistant Examiner* — Jessica Paul
(74) *Attorney, Agent, or Firm* — Kenyon & Kenyon LLP

(57) ABSTRACT

The invention relates to a polyurethane dispersant resin having a polyurethane backbone having pendant hydrophilic polyalkylene oxide based side groups, the pendant side groups being linked to the polyurethane backbone via covalent bonds, and wherein the content of polyalkylene oxide in the polyurethane dispersant resin is at least 45% by weight, characterized in that the polyurethane additionally has pendant hydrophobic side groups which are linked to the polyurethane backbone via covalent bonds.

27 Claims, No Drawings

POLYURETHANE DISPERSANT RESIN

REFERENCE TO RELATED APPLICATION(s)

This application claims the benefit of U.S. Provisional Application No. 60/712,122 filed on Aug. 30, 2005 and U.S. Provisional Application No. 60/749,041 filed on Dec. 12, 2005.

The invention relates to a polyurethane dispersant resin having a polyurethane backbone having pendant hydrophilic polyalkylene oxide based side groups, the pendant side groups being linked to the polyurethane backbone via covalent bonds. The invention further relates to compositions comprising the polyurethane dispersant resin, to processes for preparation of these compositions, and to the use of the polyurethane dispersant resin.

A polyurethane dispersant resin of the above-mentioned type is known from international patent application WO 97/19120. This document relates to a water-dispersible unsaturated polyurethane. The polyurethane comprises 10-40% by weight of pendant polyalkylene oxide groups. The polyurethane is suitable for preparation of aqueous dispersions of hydrophobic polymers and pigment dispersions.

WO 03/046038 describes a polyurethane polymer comprising from 35% to 90% by weight of a poly ($C_{2-4}$ alkylene oxide) based on the total weight of the polymer and wherein at least 5% of the poly ($C_{2-4}$ alkylene oxide) based on the total weight of the polymer is incorporated in lateral chains.

It has been found that with the known polyurethane dispersant resins the fineness of pigment pastes and the flocculation stability of pigments in paints are susceptible of further improvement, in particular when difficult-to-disperse pigments are employed. Furthermore, the known polyurethane dispersant resins are less suitable for the preparation of so-called stir-in pigment preparations. More in particular, dry pigment preparations comprising the known polyurethane dispersant resins do not lead to paints with stably dispersed pigments. Stir-in pigment preparations are frequently dry, generally powdery pigment concentrates comprising a pigment and a dispersing agent which can be incorporated into a matrix, such as a coating composition, by simple stirring without the need of an additional dispersing step, hence the name stir-in pigment preparation. Stir-in pigment preparations of organic pigments are preferably prepared by treating pigment press cakes with dispersing agents, followed by drying. When pigment press cakes are mixed with the known polyurethane dispersant resins, it is not possible to fluidize the pigment press cake to a pigment slurry, which is required for further treatment steps to obtain a stir-in pigment preparation.

Accordingly, the invention seeks to provide a polyurethane dispersant resin which permits the preparation of pigment concentrates which can be easily incorporated into coating compositions wherein the pigments are stably dispersed. In addition, the dispersant resin should be suitable for use with a wide range of pigments. The pigment concentrates should allow the preparation of paints having excellent properties and stability, especially in the case of pigments which are difficult to disperse and stabilize. The invention also seeks to provide a pigment preparation comprising a pigment and a dispersant resin which can be used as a stir-in pigment preparation, leading to a paint with stably dispersed pigments.

The invention now provides a polyurethane dispersant having pendant hydrophilic polyalkylene oxide based side groups, the pendant side groups being linked to the polyurethane backbone via covalent bonds, and wherein the content of polyalkylene oxide in the polyurethane dispersant resin is at least 45% by weight, characterized in that the polyurethane additionally has pendant hydrophobic side groups which are linked to the polyurethane backbone via covalent bonds.

The polyurethane dispersant resin of the invention permits the preparation of pigment concentrates which can be easily incorporated into coating compositions wherein the pigments are stably dispersed. In addition, the dispersant resin is suitable for use with a wide range of pigments. Pigment concentrates comprising the dispersant resin allow the preparation of paints having excellent properties and stability, especially in the case of pigments which are difficult to disperse and stabilize.

The polyurethane dispersant resin of the invention can suitably be prepared by reacting
 (a) at least one di- or polyisocyanate,
 (b) at least one compound having at least two isocyanate-reactive groups and a pendant hydrophilic polyalkylene oxide based group,
 (c) optionally one or more isocyanate-reactive compounds having at least two isocyanate-reactive groups, and
 (d) optionally, an isocyanate-reactive compound having one isocyanate-reactive group,
wherein at least one of components (a), (b), or (c) has a pendant hydrophobic side group.

As suitable di- or polyisocyanates aliphatic, cycloaliphatic or aromatic di-, tri- or tetra-isocyanates may be mentioned. Examples of diisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, dodecamethylene diisocyanate, ω,ω'-dipropylether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl methane-4,4'-diisocyanate (Desmodur® W), toluene diisocyanate, 1,3-bis(isocyanatomethyl)benzene, xylylene diisocyanate, α,α,α',α'-tetramethyl xylylene diisocyanate (TMXDI®), 1,5-dimethyl-2,4-bis(2-isocyanatoethyl) benzene, 1,3,5-triethyl-2,4-bis(isocyanatomethyl)benzene, 4,4'-diisocyanato-diphenyl, 3,3'-dichloro-4,4'-diisocyanato-diphenyl, 3,3'-diphenyl-4,4'-diisocyanato-diphenyl, 3,3'-dimethoxy-4,4'-diisocyanato-diphenyl, 4,4'-diisocyanato-diphenyl methane, 3,3'-dimethyl-4,4'-diisocyanato-diphenyl methane, and diisocyanatonaphthalene. Examples of triisocyanates include 1,3,5-triisocyanatobenzene, 2,4,6-triisocyanatotoluene, 1,8-diisocyanato-4-(isocyanatomethyl) octane, and lysine triisocyanate. Adducts and oligomers of polyisocyanates, for instance biurets, isocyanurates, allophanates, uretdiones, urethanes, iminooxadiazine diones, and mixtures thereof are also included. Examples of such oligomers and adducts are the adduct of 2 molecules of a diisocyanate, for example hexamethylene diisocyanate or isophorone diisocyanate, to a diol such as ethylene glycol, the adduct of 3 molecules of hexamethylene diisocyanate to 1 molecule of water (available under the trademark Desmodur N of Bayer), the adduct of 1 molecule of trimethylol propane to 3 molecules of toluene diisocyanate (available under the trademark Desmodur L of Bayer), the adduct of 1 molecule of trimethylol propane to 3 molecules of isophorone diisocyanate, the adduct of 1 molecule of pentaerythritol to 4 molecules of toluene diisocyanate, the adduct of 3 moles of m-α,α,α',α'-tetramethyl xylene diisocyanate to 1 mole of trimethylol propane, the isocyanurate trimer of 1,6-diisocyanatohexane, the isocyanurate trimer of isophorone diisocyanate, the uretdione dimer of 1,6- diisocyanatohexane, the biuret of 1,6-diisocyanatohexane, the allophanate of 1,6-diisocyanatohexane, and mixtures thereof.

Suitable compounds (b) can be obtained by the reaction of a polyalkylene glycol monoether with a diisocyanate, followed by reaction with a secondary amine having two hydroxyl groups. The preparation of such compounds is generally known to the skilled person. A detailed description of the preparation is given for example in U.S. Pat. No. 3,905,929.

Further examples of compounds having two isocyanate-reactive groups and a pendant hydrophilic polyalkylene oxide based group are derived from triols wherein one hydroxyl group is blocked with a polypropylene or polyethylene oxide based segment terminated with an ether group. A commercially available example of such a diol is Tegomer D 3403 ex Tego Chemie Service GmbH, Germany.

In a preferred embodiment component (b) is a compound according to formula (I) or (II), or a mixture thereof,

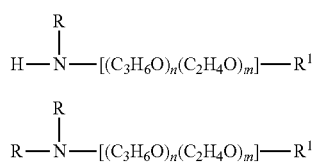

wherein R is the residue of a monoepoxide compound after reaction with an amine group, $R^1$ is selected from $C_1$ to $C_4$ alkyl groups, n is 0 to 25, m is 1 to 50, and n+m≦50. It is to be understood that the ($C_3H_6O$) and ($C_2H_4O$) units may be present in the polymer chain as blocks of polypropylene oxide and polyethylene oxide or as a more or less random mixture of propylene oxide and ethylene oxide derived units. It is preferred that R comprises a hydrocarbon group having 4 to 30 carbon atoms. Compounds of formula (I) can be obtained by the reaction of 1 mol of a primary amine with 1 mol of a monoepoxide compound, compounds of formula (II) can be obtained by the reaction of 1 mol of a primary amine with 2 mol of a monoepoxide compound. The residue R comprises a primary or secondary hydroxyl group, and preferably R comprises a hydrocarbon group having 4 to 30 carbon atoms. Thus, the compound according to formula (I) comprises a hydroxyl group and a secondary amine group as isocyanate-reactive groups. The compound according to formula (II) comprises two hydroxyl groups as isocyanate-reactive groups.

Examples of suitable monoepoxide starting materials for the preparation of compounds according to formula (I) or (II) are epoxidized olefins, such as epoxidized α-olefins; glycidyl ethers of monohydroxy compounds, such as ethylhexyl glycidyl ether, butyl glycidyl ether, hexyl glycidyl ether, phenyl glycidyl ether; and glycidyl esters of carboxylic acids, such as propionic acid glycidyl ester, hexanoic acid glycidyl ester, ethylhexanoic glycidyl ester, decanoic glycidyl ester, and versatic acid glycidyl ester, commercially available from Resolution Performance Products under the name Cardura E 10.

Examples of suitable amine starting materials for the preparation of compounds according to formula (I) or (II) are polyalkylene oxide based amines, which are commercially available from Huntsman under the trade designation Jeffamine® M.

When the compounds (b) according to formulae (I) and/or (II) are used, pigment dispersions with particularly good stability can be prepared with the polyurethane dispersant resin.

As an alternative for or in addition to the at least one compound having at least two isocyanate-reactive groups and a pendant hydrophilic polyalkylene oxide based group, it also possible to introduce pendant hydrophilic polyalkylene oxide based groups into the polyurethane by using at least one compound having at least two isocyanate groups and a pendant hydrophilic polyalkylene oxide based group in the preparation of the polyurethane dispersant resin.

In the preparation of the polyurethane dispersant resin the amount of compounds having at least two isocyanate-reactive groups and a pendant hydrophilic polyalkylene oxide based group is selected such as to assure that the content of polyalkylene oxide in the polyurethane dispersant resin is at least 45% by weight. Preferably, the amount of polyalkylene oxide in the polyurethane dispersant resin does not exceed 80% by weight. It is most preferred that the amount of polyalkylene oxide is in the range of 50 to 70% by weight. The polyurethane dispersant resin preferably comprises at least two, more preferably at least three pendant hydrophilic polyalkylene oxide based side groups per molecule.

Examples of suitable alkylene oxides are ethylene oxide, propylene oxide, and butylene oxide. It is preferred that the polyalkylene oxide based side groups are based on ethylene oxide or propylene oxide or mixtures thereof. So far very good results have been obtained with polyalkylene oxide based side groups at least 50% by weight, preferably 70% by weight of which is based on ethylene oxide, calculated on the total weight of the polyalkylene oxide based side group.

Examples of isocyanate-reactive compounds having at least two isocyanate-reactive groups include di- and polyamines, di- and polythiols, aminoalcohols, aminothiols, and in particular polyols. Suitable polyols which can be used in the preparation of the polyurethane include diols and triols and mixtures thereof, but higher-functionality polyols can also be used. Examples of lower molecular weight polyols include ethylene glycol, diethylene glycol, tetraethylene glycol, propane-1,2- and -1,3-diol, butane-1,4- and -1,3-diol, hexane-1,6-diol, octane-1,8-diol, neopentyl glycol, 1,4-bis-hydroxymethyl cyclohexane, 2-methyl-propane-1,3-diol, 2,2,4-trimethylpentane-1,3-diol, dipropylene glycol, polypropylene glycols, dibutylene glycol, polybutylene glycols, bisphenol A and tetrabromo bisphenol A, dimer fatty acid based diols, glycerol, pentaerythritol, trimethylol propane, ditrimethylol propane, hexane-1,2,6-triol, butane-1,2,4-triol, quinitol, mannitol, sorbitol, methyl glycoside, 1,4,3,6-dianhydrohexitols, the monoester of neopentyl glycol and hydroxy pivalic acid, bis(hydroxyethyl) terephthalate, furan dimethanol, and the reaction products up to molecular weight 400 of such polyols with propylene oxide and/or ethylene oxide.

Organic polymeric polyols which can be used in the preparation of the polyurethane include diols and triols and mixtures thereof, but also higher-functionality polyols can be used, for example as minor components in admixture with diols. The polymeric polyols suitably are selected from the group of polyesters, polyester amides, polyethers, polythioethers, polycarbonates, polyacetals, polyolefins, and polysiloxanes.

Polyester polyols which can be used include hydroxyl-terminated reaction products of polyhydric alcohols, such as ethylene glycol, propylene glycol, diethylene glycol, neopentyl glycol, 1,4-butane diol, 1,6-hexane diol, furan dimethanol, dimethylol cyclohexane, glycerol, trimethylol propane, pentaerythritol, and mixtures thereof with polycarboxylic acids, especially dicarboxylic acids or their ester-forming derivatives, for example succinic, glutaric, and adipic acids, and their dimethyl esters, phthalic anhydride, hexahydrophthalic anhydride, dimethyl terephthalate, and mixtures thereof. Polyesters obtained by the polymerization of lactones, for example caprolactone, in conjunction with a polyol, can also be used.

Polyester amides can be obtained by the inclusion of aminoalcohols such as ethanolamine in the polyesterification mixtures.

Suitable polyether polyols include polyalkylene oxide glycol, wherein the alkylene oxide may be selected from ethylene oxide and/or propylene oxide units. However, polyalkylene oxide glycols introduce hydrophilic groups into the polyurethane resin backbone. A too high amount of polyalkylene oxide glycol in the polyurethane resin backbone decreases its lipophilic character. The amount of polyalkylene oxide glycol is preferably limited to the extent that the polyurethane backbone remains essentially lipophilic. Therefore, the amount of polyalkylene oxide glycol preferably is below 25% by weight of the total weight of isocyanate-reactive compounds c), more preferably below 10% by weight, and most preferably below 5% by weight.

Polythioether polyols which can be used include products obtained by condensing thiodiglycol either alone or with other glycols, dicarboxylic acids, formaldehyde, aminoalcohols or aminocarboxylic acids.

Polycarbonate polyols include products obtained by reacting diols, such as 1,3-propane diol, 1,4-butane diol, 1,6-hexane diol, 1,4-cyclohexane dimethanol, diethylene glycol or tetraethylene glycol, with diaryl carbonates, for example diphenyl carbonate, or with phosgene. Polyurethane resins that comprise carbonate groups are described in more detail in WO 01/48106, and are included herein by reference. Suitable polyolefin polyols include hydroxy-terminated butadiene homo- and copolymers.

With prior art dispersant resins comprising hydrolyzable ester bonds in the polymer backbone, long-term stability problems of aqueous dispersions containing them and pH drifting have been observed. It is believed that these phenomena are at least partially due to the hydrolysis of ester bonds in the dispersant resin backbone, causing disintegration of the dispersant resin. It has been found that dispersion instability and pH drifting are virtually absent when a polyurethane dispersant resin according to the invention without hydrolyzable ester bonds in the polymer backbone is used. Therefore, in a preferred embodiment the polyurethane dispersant resin has a polyurethane resin backbone which is essentially free of hydrolyzable ester bonds. This means that polyester polyols preferably are not used as building blocks for the polyurethane dispersant of the invention. Such dispersant resins give rise to particularly stable aqueous dispersions even over prolonged periods of storage.

Compounds having one isocyanate-reactive group may optionally be used in the preparation of the polyurethane as a chain stopper to limit the molecular weight of the polyurethane. Suitable compounds are well known in the art and include monoalcohols, monoamines, and monothiols.

As mentioned above, the polyurethane dispersant of the invention additionally has pendant hydrophobic side groups which are linked to the polyurethane backbone via covalent bonds. Pendant hydrophobic side groups are different from pendant hydrophilic side groups. The term hydrophobic describes the tendency of a molecule or molecular group not to penetrate water or to leave the aqueous phase, as defined in DIN EN ISO 862: 1995-10. Hydrophobic properties of molecules or groups are generally linked to the presence of hydrocarbon groups. Therefore, in one embodiment the hydrophobic side groups comprise hydrocarbon groups having at least 4, or at least 6, or at least 8, carbon atoms.

The hydrocarbon groups may have a large number of carbon atoms, for example when polyolefins such polyethylene, polypropylene, polybutylene, o polybutadiene form the hydrocarbon groups. In such cases, the number of carbon atoms may be up to several hundreds, depending on the degree of polymerization. In other cases, the hydrocarbon groups have up to 50, or 30, or carbon atoms. The hydrocarbon groups may be saturated. However, also suitable are unsaturated hydrocarbon groups and aromatic hydrocarbon groups. The hydrocarbon groups may be linear, cyclic, or branched. Branched hydrocarbon groups are preferred. The hydrophobic side groups may also contain ester and ether groups. As an example, side groups based on poly caprolactone or on fatty acid based polyesters may be mentioned.

The number and the molecular weight of the pendant hydrophobic and hydrophilic side groups determine the hydrophilic/hydrophobic balance of the polyurethane of the invention. The polyurethane dispersant resin preferably comprises at least two, more preferably at least three pendant hydrophobic side groups per molecule. In one embodiment, the number of hydrophobic side groups attached to a polyurethane polymer backbone is equal to the number of hydrophilic polyalkylene oxide based side groups attached thereto.

The pendant hydrophobic side groups can be introduced into the polyurethane dispersant analogously to the hydrophilic polyalkylene oxide based side groups described above. Suitable building blocks for introducing pendant hydrophobic side groups into the polyurethane dispersant are compounds having two isocyanate-reactive groups and at least one pendant hydrophobic side group. Such compounds may for example be prepared by reaction of a hydrophobic epoxide-functional compound with an amine-functional compound. It is also possible to obtain such compounds by reaction of a non-hydrophobic epoxide-functional compound with an amine having a hydrophobic group. Also suitable are the reaction products of a hydrophobic epoxide-functional compound and an amine having a hydrophobic group. In this case, a compound having two isocyanate-reactive groups and two pendant hydrophobic side groups is obtained. In still another embodiment, it is possible to use the reaction product of a hydrophobic epoxide-functional compound and an amine having a hydrophilic polyalkylene oxide group. Such a reaction product has two isocyanate-reactive groups, a pendant hydrophobic side group, and a pendant polyalkylene oxide based side group. So far very good results have been obtained with the glycidyl ester of versatic acid, commercially available as Cardura E 10, as hydrophobic epoxide-functional compound.

Alternatively, it is also possible to use compounds having two isocyanate-functional groups and at least one pendant hydrophobic side group.

The polyurethane dispersant resin can be prepared in a conventional manner by reacting the organic polyisocyanate with the other reactants under substantially anhydrous conditions at a temperature between about 30° C. and about 130° C. until the reaction between the isocyanate groups and the isocyanate-reactive groups is substantially complete. The reaction may optionally be catalyzed by a catalyst, such as dibutyl tin dilaurate. The reactants are generally used in proportions corresponding to a ratio of isocyanate groups to isocyanate-reactive (usually hydroxyl) groups of from about 1:1 to about 6:1, preferably about 1:1. If an excess of the organic polyisocyanate is used, an isocyanate-terminated prepolymer can be prepared in a first step. In a second step, at least one isocyanate-reactive group-containing compound can be added.

The molar ratio and the functionality of the starting materials used for the preparation of the polyurethane dispersant resin are suitably selected so as to avoid gelation of the polyurethane and to arrive at a number average molecular weight of the polyurethane in the range of 800 to 100,000. Preferably, the number average molecular weight is in the range of 1,000 to 50,000, more preferably 2,000 to 20,000. In a typical embodiment, the polyurethane backbone of the resin is essentially linear and preferably lipophilic, having pendant hydrophilic polyalkylene oxide side groups. Such polymers may also be described as comb polymers. They may be formed from difunctional and, optionally, monofunctional starting materials. Alternatively, isocyanates and/or isocyanate-reactive compounds having a functionality above 2 can be included in the preparation of the polyurethane dispersant resin, leading to a branched polyurethane.

When a molar excess of isocyanate-reactive starting materials is used for the preparation of the polyurethane dispersant resin, a polyurethane having isocyanate-reactive end groups, such as hydroxyl groups, is obtained. A polyurethane dispersant resin having hydroxyl groups is preferred, for example a polyurethane dispersant having a hydroxyl value in the range of 2 to 100 mg KOH/g, preferably in the range of 5 to 50 mg KOH/g.

The polyurethane dispersant may comprise tertiary amine groups. The tertiary amine value of the polyurethane dispersant suitably does not exceed 50 mg KOH/g. Preferably, the tertiary amine value is in the range of 2 to 30 mg KOH/g, based on the non-volatile matter of the polyurethane dispersant resin. Tertiary amine groups are suitably introduced into the polyurethane by tertiary amine-functional di- or polyisocyanates or by tertiary amine-functional isocyanate-reactive compounds. Particularly suitable tertiary amine-functional isocyanate-reactive compounds are compounds according to formula (II). However, other tertiary amine-functional isocyanate-reactive compounds can be employed as well, for example tertiary amine-functional diols.

It is further preferred that at least a part of the tertiary amine groups present in the polyurethane dispersant resin is neutralized with an acidic neutralizing agent. Suitable acidic neutralizing agents are mineral acids as well as organic acids, carboxylic acids being preferred. A particularly preferred acidic neutralizing agent is acetic acid.

In still another embodiment, the polyurethane dispersant resin comprises anionic groups or groups capable of forming anions. Typical examples of groups capable of forming anions are carboxylic acid groups, sulfonic acid groups, and phosphoric or phosphorous acid groups. Such groups can be introduced into the polyurethane dispersant resin by isocyanate-reactive compounds comprising anionic groups or groups capable of forming anions. Dimethylol propionic acid and sulfonate-functional diols may be mentioned as typical examples. The formation of anionic groups can be carried out prior to or after preparation of the polyurethane. Typically, anionic groups are formed by treating the groups capable of forming anions with a basic neutralizing agent, such as ammonia or an amine, or alkali metal hydroxides.

The polyurethane dispersant resin can be used in various physical forms. When the dispersant resin is of low molecular weight or of low viscosity or to be applied at elevated temperature, it may be appropriate to use the neat resin or to use the resin as a melt or as a powder. Alternatively, it is possible to use the polyurethane dispersant resin in the form of a solution in an organic solvent. It is preferred to use the polyurethane dispersant resin in an aqueous carrier medium, such as an aqueous solution or dispersion. Aqueous solutions are particularly preferred.

The invention also relates to a composition comprising the polyurethane dispersant resin and particles.

In one embodiment of the composition, the particles are pigment particles. Compositions comprising a high proportion of pigment, i.e. pigment concentrates, are preferred, because such compositions are particularly effective in providing colour and hiding to paints. The pigment concentrates generally comprise 5 to 85% by weight, preferably 20 to 75% by weight of pigment, based on the total weight of the pigment concentrate.

The composition suitably comprises up to 150% by weight, preferably 1 to 100% by weight, and most preferably 2 to 50% by weight of the polyurethane dispersant resin of the invention, calculated on the weight of the pigment. The most suitable amount of polyurethane dispersant resin depends, among others, on the particular type of pigment to be dispersed. The mixture may optionally comprise other known additives, such as additional dispersing agents, anti-foaming agents, and/or polymeric or oligomeric binders.

The composition may be a liquid composition comprising an organic and/or an aqueous based diluent. Also dry pigment concentrates can be used, for example in the form of powders, pellets or tablets.

The pigment concentrate can be part of a modular system for preparation of a pigmented coating composition. Such a modular system may, for example, comprise one or more pigment concentrates as a tinting module, a binder module, and a reducer module. The base coat compositions mentioned below can suitably be prepared by mixing the modules of such a modular system.

The pigment concentrates or tinting pastes can be obtained by a process wherein a liquid mixture comprising a pigment, the polyurethane dispersant resin of the invention, and optionally a liquid diluent are subjected to shear force. The pigment dispersant resin of the invention can be used in combination with one or more other pigment dispersion aids and/or surfactants. Examples of suitable equipment for carrying out the process are bead mills, jet mills, ultrasonic mills, basket mills, roll mills, and high-speed dissolvers. Inorganic or organic pigments or mixtures thereof may be used. Preferably, water is used as a liquid diluent. Instead of water or in addition to water organic solvents may be used, such as glycols or glycol ethers, for example ethylene glycol or higher homologues thereof or ethylene glycol mono-n-butyl ether.

The polyurethane dispersant resin according to the invention can also be used for the preparation of stir-in pigments.

In one embodiment, the composition according to the invention is a solid pigment preparation comprising a pigment and the polyurethane dispersant resin, wherein the composition comprises at least 35% by weight of at least one pigment and at most 65% by weight of dispersant resin, calculated on the combined weight of pigment and dispersant resin.

The pigment preparation of the invention can be used as a stir-in pigment preparation, leading to coating compositions with stably dispersed pigments. The pigment preparation can be easily incorporated into coating compositions in which the pigments are stably dispersed. In addition, it is possible to prepare the pigment preparation with a wide range of pigments. The pigment preparation allows the preparation of paint having excellent properties and stability, especially in the case of difficult to disperse and stabilize pigments.

The pigment preparation of the invention may comprise an inorganic or an organic pigment. Alternatively, the pigment preparation may comprise a plurality of different pigments, for example two or more inorganic pigments, two or more organic pigments, or a mixture of one or more inorganic pigments and one or more organic pigments.

The pigment particles within the composition are generally present in finely divided form. Accordingly, the pigments typically have average particle sizes within the range of 50 nm to 5,000 nm. Preferably, the average particle size is at least 80 nm, more preferably at least 100 nm. It is preferable that the average particle size is at most 3,000 nm, more preferably at most 1,500 nm, and most preferably at most 1,000 nm.

The average particle size of the pigment particles within the preparation can for example be determined by electron microscopy. Since the average particle size of the pigments within the preparation is essentially the same as the average particle size of the pigments after they are stirred into a liquid, it is also possible to mix the pigment preparation with a liquid medium and to determine the average pigment particle size by dynamic light scattering.

The organic pigments typically are organic chromatic and black pigments. The inorganic pigments can likewise be colour pigments (chromatic, black, and white pigments), as well as luster pigments and the inorganic pigments which are typically used as fillers.

Examples of suitable organic colour pigments are:
monoazo pigments:
C.I. Pigment Brown 25; C.I. Pigment Orange 5, 13, 36, 38, 64, and 67; C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247, and 251; C.I. Pigment Yellow 1, 3, 62, 65, 73, 74, 97, 120, 151, 154, 168, 181, 183, and 191; C.I. Pigment Violet 32;
diazo pigments:
C.I. Pigment Orange 16, 34, 44, and 72; C.I. Pigment Yellow 12, 13, 14, 16, 17, 81, 83, 106, 113, 126, 127, 155, 174, 176, 180, and 188;
diazo condensation pigments:
C.I. Pigment Yellow 93, 95, and 128; C.I. Pigment Red 144, 166, 214, 220, 221, 242, and 262; C.I. Pigment Brown 23 and 41;
anthanthrone pigments:
C.I. Pigment Red 168;
anthraquinone pigments:
C.I. Pigment Yellow 147, 177, and 199; C.I. Pigment Violet 31;
anthrapyrimidine pigments:
C.I. Pigment Yellow 108;
quinacridone pigments:
Pigment Orange 48 and 49; C.I. Pigment Red 122, 202, 206, and 209; C.I. Pigment Violet 19;
quinophthalone pigments:
C.I. Pigment Yellow 138;
diketopyrrolopyrrole pigments:
C.I. Pigment Orange 71, 73, and 81; C.I. Pigment Red 254, 255, 264, 270, and 272;
dioxazine pigments:
C.I. Pigment Violet 23 and 37; C.I. Pigment Blue 80;
flavanthrone pigments:
C.I. Pigment Yellow 24;
indanthrone pigments:
C.I. Pigment Blue 60 and 64;
isoindoline pigments:
C.I. Pigments Orange 61 and 69; C.I. Pigment Red 260; C.I. Pigment Yellow 139 and 185;
isoindolinone pigments:
C.I. Pigment Yellow 109, 110, and 173;
isoviolanthrone pigments:
C.I. Pigment Violet 31;
metal complex pigments:
C.I. Pigment Red 257; C.I. Pigment Yellow 117, 129, 150, 153, and 177; C.I. Pigment Green 8;
perinone pigments:
C.I. Pigment Orange 43; C.I. Pigment Red 194;
perylene pigments:
C.I. Pigment Black 31 and 32; C.I. Pigment Red 123, 149, 178, 179, 190, and 224; C.I. Pigment Violet 29;
phthalocyanine pigments:
C.I. Pigment Blue 15, 15:1, 15:2, 15:3, 15:4, 15:6, and 16; C.I. Pigment Green 7 and 36;
pyranthrone pigments:
C.I. Pigment Orange 51; C.I. Pigment Red 216;
pyrazoloquinazolone pigments:
C.I. Pigment Orange 67; C.I. Pigment Red 251;
thioindigo pigments:
C.I. Pigment Red 88 and 181; C.I. Pigment Violet 38;
triarylcarbonium pigments:
C.I. Pigment Blue 1, 61 and 62; C.I. Pigment Green 1; C.I. Pigment Red 81, 81:1, and 169; C.I. Pigment Violet 1, 2, 3, and 27; C.I. Pigment Black 1 (aniline black); C.I. Pigment Yellow 101 (aldazine yellow); C.I. Pigment Brown 22.

Examples of suitable inorganic colour pigments are:
white pigments:
titanium dioxide (C.I. Pigment White 6), zinc white, pigment grade zinc oxide;
zinc sulfide, lithopone;
black pigments:
iron oxide black (C.I. Pigment Black 11), iron manganese black, spinel black (C.I. Pigment Black 27); carbon black (C.I. Pigment Black 7);
chromatic pigments:
chromium oxide, chromium oxide hydrate green; chrome green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt violet; manganese violet; red iron oxide (C.I. Pigment Red 101); cadmium sulfoselenide (C.I. Pigment Red 108); cerium sulfide (C.I. Pigment Red 265); molybdate red (C. I. Pigment Red 104); ultramarine red; brown iron oxide (C.I. Pigment Brown 6 and 7), mixed brown, spinel phases and corundum phases (C.I. Pigment Brown 29, 31, 33, 34, 35, 37, 39, and 40), chromium titanium yellow (C.I. Pigment Brown 24), chrome orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164, and 189); chromium titanium yellow; spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).

Examples of inorganic pigments typically used as fillers are transparent silicon dioxide, ground quartz, aluminium oxide, aluminium hydroxide, natural micas, natural and precipitated chalk, and barium sulfate.

Luster pigments are platelet-shaped pigments having a monophasic or polyphasic construction whose colour play is marked by the interplay of interference, reflection, and absorption phenomena. Examples are aluminium platelets and aluminium, iron oxide, and mica platelets bearing one or more coats, especially of metal oxides.

As mentioned above, the pigment preparation of the invention comprises as essential ingredients a pigment and a dispersant resin. When solid, the composition suitably comprises at least 35% by weight of at least one pigment and at most 65% by weight of dispersant resin, calculated on the combined weight of pigment and dispersant resin. When the pigment in the preparation is carbon black, it is preferred that the content of carbon black in the pigment preparation is in the lower part of the described range. Thus, when the pigment is carbon black, the pigment preparation preferably comprises at least 40% by weight, more preferably at least 45% by weight of carbon black, and at most 60% by weight, preferably at most 55% by weight of dispersant resin, calculated on the combined weight of pigment and dispersant resin. With other pigments, the pigment preparation generally comprises at least 60% by weight, preferably at least 64% by weight, more preferably at least 68% by weight, and most preferably at least 70% by weight of at least one pigment, and at most 40% by weight, preferably at most 36% by weight, more preferably at most 32% by weight, and most preferably at most 30% by weight of dispersant resin, calculated on the combined weight of pigment and dispersant resin. In a particularly preferred embodiment, the above-mentioned weight ratios of pigment and dispersant resin also apply when calculated on the total weight of the pigment preparation.

The pigment preparation may further comprise other ingredients, additives or auxiliaries commonly used in pigment preparations, such as organic solvents, wetting agents, antifoaming agents, heat stabilizers, light stabilizers, anti-oxidants, and other pigment dispersion aids and/or surfactants.

In one embodiment, the pigment preparation of the invention is a free-flowing powder which is suitable for use as stir-in pigment. Also solid compacted pigment concentrates can be used, for example in the form of pellets or tablets.

The invention further relates to a process for the preparation of a pigment preparation comprising the steps of
   a) stirring a composition comprising a pigment and the dispersant resin according to the invention, optionally with added water or organic diluent, to form a fluidized pigment slurry,
   b) optionally, milling the slurry, and
   c) drying the slurry.

As mentioned above in respect of the pigment preparation, the pigment used in the process can be an organic or an inorganic pigment. It is also possible to use a mixture of pigments, for example a mixture of two or more inorganic pigments, a mixture of two or more organic pigments, or a mixture of inorganic and organic pigments. It is possible to use a large variety of pigments in the process. The pigments can be introduced into the process as standard dried pigments. The milling step serves to break up agglomerates and to achieve the required pigment particle size. Organic pigments are also available as so-called press cakes. Organic pigments, when synthesized, are in the form of very small crystals, called primary particles. The aim of pigment synthesis is to produce primary particles of a size that optimizes pigment application properties such as colour strength, tone and brightness, transparency and opacity, and flow properties. The press cake contains the pigment essentially in this disaggregated form. Hence, less energy is required to break up agglomerates and to achieve the required pigment particle size. During drying of the pigment press cake in the absence of dispersant resin, primary particles will join together to form aggregates and agglomerates. Therefore, when an organic pigment is used in the process, it is possible and preferred to use the organic pigment in the form of a pigment press cake. When pigment press cakes are used, simple stirring of the fluidized pigment slurry may be sufficient to achieve the required pigment particle size. Milling of the slurry may be redundant in such cases.

When additional liquid is required to fluidize the mixture of pigment and dispersant resin, it is preferred that the liquid is water. Instead of water or in addition to water organic solvents may be used, such as glycols or glycol ethers, for example ethylene glycol or higher homologues thereof or ethylene glycol mono-n-butyl ether.

The optional milling step can be carried out using well-known milling equipment usually employed for breaking down the particle size of pigments. Examples of suitable equipment for carrying out the process are bead mills, jet mills, ultrasonic mills, basket mills, roll mills, and high-speed dissolvers. Milling is generally continued until the average particle size is within the range of 50 nm to 5,000 nm. Preferably, the average particle size is at least 80 nm, more preferably at least 100 nm. It is preferable that the average particle size is at most 3,000 nm, more preferably at most 1,500 nm, and most preferably at most 1,000 nm.

Examples of suitable methods of drying are spray granulation and fluidized bed drying, spray-drying, drying in a paddle dryer, evaporation and subsequent comminution, and freeze-drying. The selected method of drying may influence the particle size of the pigment preparations of the present invention. The drying step is preferably carried out by freeze-drying or by spray-drying.

Spray and fluidized bed granulation may produce coarsely divided granules having average particle sizes from 50 to 5,000 μm and especially from 100 to 1,000 μm. Depending on the process conditions, spray-drying may also produce finely divided pigment preparations. Spray-drying typically produces granules having average particle sizes <20 μm. Finely divided preparations are also obtainable by drying in a paddle dryer and by evaporation with subsequent grinding.

The residual moisture content of the dried pigment preparation obtained can vary significantly, provided that the dried preparation is a solid preparation. The residual moisture content may for example be 15% by weight, calculated on the weight of the total pigment preparation. Generally, the residual moisture content does not exceed 15% by weight, preferably it does not exceed 12% by weight. In many cases, the residual moisture content is even less than 5% by weight. When the pigment preparation is intended for use in non-aqueous systems, a low residual moisture content is particularly preferred, for example less than 2% by weight.

The pigment preparations of the present invention are notable in use for their excellent colour properties, especially with regard to colour strength, brilliance, hue and hiding power, and especially for their stir-in characteristics, i.e. they can be dispersed in application media with a minimal input of energy, simply by stirring or shaking.

The pigment preparations of the present invention additionally have the following advantages: they have a high pigment content, exhibit very good stability in storage, are both economically and ecologically advantageous with regard to packaging, storage, and transportation, and they are more flexible in use.

The pigment preparations of the present invention are very useful for pigmenting macromolecular organic and inorganic materials of any kind. Liquid application media in this context can be purely aqueous, comprise mixtures of water and organic solvents, for example alcohols, or be based exclusively on organic solvents, such as alcohols, glycol ethers, ketones, e.g. methylethyl ketone, amides, e.g. N-methylpyrrolidone and dimethyl formamide, esters, e.g. ethyl acetate, butyl acetate, and methoxypropyl acetate, or aromatic or aliphatic hydrocarbons, e.g. xylene, mineral oil, and mineral spirits.

Examples of materials which can be pigmented with the pigment preparations of the present invention include: coatings, for example architectural coatings, industrial coatings, automotive coatings, radiation-curable coatings, powder coatings; paints, including paints for building exteriors and building interiors, for example wood paints, lime washes, distempers, emulsion paints; solvent borne printing inks, for example offset printing inks, flexographic printing inks, toluene intaglio printing inks, textile printing inks, radiation-curable printing inks; water borne inks, including inkjet inks; colour filters; building materials (water is typically added only after the building material and the pigment preparation have been dry-mixed), for example silicate render systems, cement, concrete, mortar, gipsum; bitumen, caulks; cellulosic materials, for example paper, paperboard, cardboard, wood and woodbase, which can each be coated or otherwise finished; adhesives; film-forming polymeric protective colloids as used for example in the pharmaceutical industry; cosmetic articles; plastics; and detergents.

The pigment preparations of the present invention are particularly useful as mixing components in colour-mixing or -matching systems. Owing to their stir-in characteristics, they can be used directly as a solid for this purpose. If desired, however, they may also be first converted into base colours, mixing varnishes, and tinting colours (especially into colours having a high solids content, "HS colours"), or even more highly pigmented tinting pastes, which then constitute the components of the mixing system. The matching of the desired hue and hence the mixing of the colour components can be effected visually via a system of colour cards in a very large number of hue gradations based on colour standards, such as RAL, BS, and NCS, or preferably under computer control, whereby an unlimited number of hues become accessible ("computer colour matching").

The invention further relates to a coating composition comprising at least one organic film forming binder which is different from the polyurethane dispersant resin, at least one pigment, and a pigment dispersant resin, wherein the pigment dispersant resin is a polyurethane dispersant resin as described above. It is preferred that the coating composition is an aqueous coating composition. The coating composition may for example be a base coat composition, preferably an aqueous base coat composition. Base coat compositions are colour- and/or effect-imparting coating compositions which are used in multilayer lacquer systems having a clear top coat. Such multilayer lacquer systems are frequently used to protect and decorate motor vehicles and large transportation vehicles. The coating composition may further comprise other ingredients, additives or auxiliaries commonly used in coating compositions, such as dyes, levelling agents, organic solvents, wetting agents, anti-cratering agents, anti-foaming agents, antisagging agents, heat stabilizers, light stabilizers, UV absorbers, antioxidants, and fillers. It is also possible to use the pigment dispersant resin of the invention in combination with one or more other pigment dispersion aids and/or surfactants.

The polyurethane dispersant resin according to the invention is also suitable for dispersing hydrophobic resins in aqueous systems. Therefore, the invention also relates to the use of the dispersant in a process for dispersing a hydrophobic resin in an aqueous system, and to an aqueous composition comprising the polyurethane dispersant resin and at least one dispersed hydrophobic resin. Such a composition can advantageously be used as a binder component in an aqueous two-component coating composition.

The polyurethane dispersant resin may also be used to disperse other hydrophobic and/or difficult-to-disperse materials in water. Examples of such other materials are additives and auxiliary materials, such as catalysts, UV-absorbers, and light stabilizers.

EXAMPLES

Raw Materials Used

| | |
|---|---|
| Jeffamine M 1000 | Polyalkylene oxide based amine ex Huntsman |
| Cardura E10 | Glycidyl ester of versatic acid ex Resolution Performance Products |
| Tegomer D 3403 | Diol having a polyalkylene oxide based side group ex Tego Chemie Service GmbH |
| Tegomer D 3123 | Diol having a polyalkylene oxide based side group ex Tego Chemie Service GmbH |
| Pripol 2033 | Dimer fatty acid based diol ex Uniqema |
| Autowave | Water borne modular base coat system ex Akzo Nobel Car Refinishes |
| Autowave 665 | Clear base module of Autowave comprising a blend of polyurethane and acrylic resin dispersions ex Akzo Nobel Car Refinishes |
| Autowave 666 | Clear base module of Autowave comprising an acrylic resin dispersion ex Akzo Nobel Car Refinishes |
| Autowave 357 | Red toner module of Autowave ex Akzo Nobel Car Refinishes |
| Autowave 00 | White toner module of Autowave ex Akzo Nobel Car Refinishes |

General Methods:

The solids content of the compositions was determined by measuring the weight loss after heating a sample to 140° C. for 30 minutes.

The viscosities were determined with a Brookfield viscometer.

The molecular weights were determined by size exclusion chromatography using polystyrene as standard.

The fineness of the pigment dispersions was determined with a Hegman gauge. The reported fineness value in µm represents the largest particles found in the sample.

The flocculation of the pigments was determined by microscopic comparison with reference samples of the same pigment class. The results are reported on a scale from 0 to 10, wherein 0 indicates very severe flocculation and 10 indicates no flocculation.

The transparency of the samples was determined by determination of the light transmission of samples in cuvettes. The results are reported in % light transmission.

The gloss was determined with a Byk-Gardner gloss meter and the results are reported in gloss units.

The chroma (C*) values were determined according to the CIE LCh system.

Example 1

Preparation of a Polyurethane Dispersant Resin According to the Invention

In a reaction vessel fitted with a stirrer, a thermocouple, a heating jacket, a reflux condenser, and a dropping funnel were placed 347.5 g of Jeffamine M 1000. The contents of the vessel were heated to 120° C. under a blanket of nitrogen, and during a period of 30 minutes 138.5 g of Cardura E 10 were added via the dropping funnel. The contents of the reaction vessel were kept at a temperature of 120° C. for 4 hours and afterwards allowed to cool to ambient temperature. Then the following components were added to the reaction vessel:
20.2 g of 1,4-cyclohexane dimethanol 7.3 g of neopentyl glycol
62.0 g of 2-butanone
104.8 g of 4,4'-diisocyanatodicyclohexyl methane.

The reaction mixture was heated to 120° C. and kept at this temperature for 2 hours. 4 drops of dibutyl tin dilaurate were added and the reaction mixture was kept at 120° C. for a further 2 hours. Subsequently the 2-butanone was distilled off under reduced pressure. The reaction mixture was allowed to cool to 100° C. and at this temperature 13.1 g of a 10% by weight aqueous solution of acetic acid were added. Subsequently 1,575 g of demineralized water were added over a period of 3 hours under gradual cooling to ambient temperature. A clear solution of a polyurethane dispersant resin in water was obtained. The alkylene oxide content of the resin was 56.2% by weight, the ethylene oxide content was 48.5% by weight. The tertiary amine content was 0.38 mmol/g.

Example 2

Preparation of a Polyurethane Dispersant Resin According to the Invention

A polyurethane resin was prepared according to the procedure described above for Example 1 from the following starting materials:
710.8 g of Jeffamine M 1000
302.2 g of Cardura E 10
58.1 g of 1,4-cyclohexane dimethanol
125.0 g of 2-butanone
187.0 g of isophorone diisocyanate
8 drops of dibutyl tin dilaurate
3,082 g of demineralized water.

No acetic acid was added to the polyurethane. A clear solution of a non-ionic polyurethane dispersant resin in water was obtained. The alkylene oxide content of the resin was 56.3% by weight, the ethylene oxide content was 48.8% by weight. The tertiary amine content was 24.7 mg KOH/g.

Example 3

Preparation of a Polyurethane Dispersant Resin According to the Invention

A polyurethane resin was prepared according to the procedure described above for Example 1 from the following starting materials:
726.2 g of Jeffamine M 1000
253.4 g of Cardura E 10
66.2 g of 1,4-cyclohexane dimethanol
125.0 g of 2-butanone
204.0 g of isophorone diisocyanate
8 drops of dibutyl tin dilaurate
3,082 g of demineralized water
25 g of a 10% by weight aqueous solution of acetic acid.

A clear solution of a polyurethane dispersant resin in water was obtained. The alkylene oxide content of the resin was 58.1% by weight, the ethylene oxide content was 50.2% by weight. The tertiary amine content was 15.1 mg KOH/g.

Example 4

Preparation of a Polyurethane Dispersant Resin According to the Invention

In a reaction vessel fitted with a stirrer, a thermocouple, a heating jacket, a reflux condenser, and a dropping funnel were placed 778.8 g (0.74 mol) Jeffamine M 1000. The contents of the vessel were heated to 120° C. under a blanket of nitrogen, and during a period of 30 minutes 181.1 g (0.74 mol) Cardura E 10 were added via the dropping funnel. Subsequently the contents of the reaction vessel were kept at 120° C. for 4 hours and afterwards allowed to cool to ambient temperature. Then the following components were added to the reaction vessel:
71.0 g of 1,4-cyclohexane dimethanol
125.0 g of 2-butanone.

The mixture was heated to 65° C. and at this temperature 218.0 g of isophorone diisocyanate were added. The reaction mixture was heated to 120° C. and kept at this temperature for 2 hours. Then 4 drops of dibutyl tin dilaurate were added and the reaction mixture was kept at 120° C. for a further 2 hours. Subsequently the 2-butanone was distilled off under reduced pressure and 3,060 g of demineralized water were added over a period of 3 hours under gradual cooling to ambient temperature. A clear solution of a non-ionic polyurethane dispersant resin in water was obtained. The alkylene oxide content of the resin was 62.3% by weight, the ethylene oxide content was 53.8% by weight. The tertiary amine content was 5.6 mg KOH/g.

Example 5

Preparation of a Polyurethane Dispersant Resin According to the Invention

A polyurethane resin was prepared according to the procedure described above for Example 1 from the following starting materials:
711.1 g of Jeffamine M 1000
302.3 g of Cardura E 10
50.8 g of 1,4-cyclohexane dimethanol
6.7 g of dimethylol propionic acid
125.0 g of 2-butanone
179.0 g of isophorone diisocyanate
8 drops of dibutyl tin dilaurate
3,060 g of demineralized water.

No acetic acid was added to the polyurethane. A clear solution of a polyurethane dispersant resin in water was obtained. The alkylene oxide content of the resin was 56.9% by weight, the ethylene oxide content was 49.1% by weight. The tertiary amine content was 2.24 mg KOH/g, the carboxylic acid/carboxylate content was 0.04 mmol/g.

Example 6

Preparation of a Polyurethane Dispersant Resin According to the Invention

A polyurethane resin was prepared according to the procedure described above for Example 5 from the following starting materials:
711.4 g of Jeffamine M 1000
302.4 g of Cardura E 10
43.5 g of 1,4-cyclohexane dimethanol
13.5 g of dimethylol propionic acid
125.0 g of 2-butanone
179.1 g of isophorone diisocyanate
8 drops of dibutyl tin dilaurate
3,060 g of demineralized water.

A clear solution of a polyurethane dispersant resin in water was obtained. The alkylene oxide content of the resin was 56.9% by weight, the ethylene oxide content was 49.1% by weight. The tertiary amine content was 22.4 mg KOH/g, the carboxylic acid/carboxylate content was 4.5 mg KOH/g.

Example 7

Preparation of a Polyurethane Dispersant Resin According to the Invention

A polyurethane resin was prepared according to the procedure described above for Example 5 from the following starting materials:
707.0 g of Jeffamine M 1000
300.6 g of Cardura E 10
108.2 of Pripol 2033
125.0 g of 2-butanone
133.5 g of isophorone diisocyanate
8 drops of dibutyl tin dilaurate
3,060 g of demineralized water.

A clear solution of a polyurethane dispersant resin in water was obtained. The alkylene oxide content of the resin was 56.6% by weight, the ethylene oxide content was 48.9% by weight. The tertiary amine content was 22.4 mg KOH/g.

Example 8

Preparation of a Polyurethane Dispersant Resin According to the Invention

In a reaction vessel equipped as above for Example 1 were placed
686.4 g of Tegomer D 3403
348.4 g of the reaction product of 1 mol of cyclohexyl amine and 2 mol of Cardura E 10
125.0 g of 2-butanone.

These components were stirred until homogeneous and
215.2 g of isophorone diisocyanate
were added. The reaction mixture was heated to 120° C. under a blanket of nitrogen and kept at this temperature for 2 hours. Subsequently 8 drops of dibutyl tin dilaurate were added to the reaction mixture and the reaction was continued for another 2 hours at 120° C. Then 2-butanone was distilled off under reduced pressure and 2,331 g of demineralized water were added over a period of 3 hours with gradual cooling to ambient temperature. A clear solution of a non-ionic polyurethane dispersant resin in water was obtained. The ethylene oxide content of the resin was 54% by weight. The tertiary amine content was 25.8 mg KOH/g.

Comparative Example A

Preparation of a Comparative Polyurethane Dispersant Resin According to WO 97/19120

In a reaction vessel equipped as above were placed 368.8 g of Tegomer D 3403, 507.5 g of oleyl alcohol, 456.9 g of a sulfosuccinate diol being the reaction product of 1 mol of maleic acid, 2 mol of Cardura® E 10, and 1 mol of NaHSO$_3$, and 196.0 g of 2-butanone. The components were mixed and 420.5 g of isophorone diisocyanate were added via a dropping funnel. The mixture was heated to 120° C. and kept at this temperature for 2 hours. Then 0.5 g of dibutyl tin dilaurate was added and the reaction was continued for another 2 hours at 120° C. The temperature was then lowered to 90° C. and distillation at reduced pressure was carried out to remove essentially all volatile solvents. Thereafter 6,746 g of water were added in 3 hours, during which period the mixture was allowed to cool to room temperature. An aqueous solution of a polyurethane dispersant resin was obtained. The ethylene oxide content of the polyurethane was 18.7% by weight.

Comparative Example B

Preparation of a Polyurethane Dispersant Resin Having No Pendant Hydrophobic side groups In a reaction vessel equipped as above for Example 1 were placed
354.0 g of Tegomer D 3123
40.5 g of Pripol 2033
26.0 g of 2-ethylhexanol
90.0 g of 2-butanone.

These components were stirred until homogeneous and
122.1 g of isophorone diisocyanate
were added. The reaction mixture was heated to 110° C. under a blanket of nitrogen and kept at this temperature for 2 hours. Subsequently 2 drops of dibutyl tin dilaurate were added to the reaction mixture and the reaction was continued for another 2 hours at 110° C. Then 2-butanone was distilled off under reduced pressure and 1,328 g of demineralized water were added over a period of 3 hours with gradual cooling to ambient temperature. A clear solution of a non-ionic polyurethane dispersant resin in water was obtained. The alkylene oxide content of the resin was 65% by weight, the ethylene oxide content was 55% by weight.

Table 1 summarizes further properties of the polyurethane dispersant resins prepared above.

TABLE 1

| Example | Solids content in % by weight | Viscosity in Pa s | pH | Mn | Mw |
|---|---|---|---|---|---|
| 1 | 26.8 | 0.24 | 7.2 | 4,700 | 8,050 |
| 2 | 28.3 | 0.50 | 9.7 | 4,140 | 6,280 |
| 3 | 28.4 | 0.21 | 7.7 | 4,420 | 7,060 |
| 4 | 29.3 | 0.42 | 9.8 | 4,690 | 6,550 |
| 5 | 28.5 | 0.98 | 8.3 | 4,060 | 5,950 |
| 6 | 29.7 | 1.08 | 7.2 | 3,810 | 5,940 |
| 7 | 27.8 | 0.60 | 9.9 | 3,400 | 5,450 |
| 8 | 34.2 | 1.30 | 7.4 | 6,050 | 10,050 |
| A | 26.0 | 0.55 | 6.9 | 1,760 | 2,850 |
| B | 28.8 | 0.64 | 5.5 | 6,400 | 13,330 |

Example 9

Preparation of Aqueous Dispersions of Hydrophobic Polyester Resins

A hydrophobic polyester resin I was prepared by a standard esterification process from 134 g of trimethylol propane, 288 g of cyclohexane dimethanol, and 308 g of hexahydrophthalic anhydride. A polyester resin I having an OH value of 251 mg KOH/g and an acid value of 8.6 mg KOH/g was obtained.

A hydrophobic polyester resin 11 was prepared by a standard esterification process from 141 g of trimethylol propane, 249 g of 1,6-hexane diol, and 324 g of hexahydrophthalic anhydride. A polyester resin 11 having an OH value of 266 mg KOH/g and an acid value of 3.9 mg KOH/g was obtained.

The hydrophobic polyester resins I and II were mixed with the polyurethane dispersant resin from Example 4 to form mixtures A, B, and C:

| Mixture A: | 80 g of polyester resin I |
| --- | --- |
| | 20 g of polyurethane dispersant resin from Example 4 |
| | 25 g 2-of methoxypropyl acetate (diluent) |

Mixture A had an OH value of 164 mg KOH/g

| Mixture B: | 90 g of polyester resin I |
| --- | --- |
| | 10 g of polyurethane dispersant resin from Example 4 |
| | 33 g of 2-methoxypropyl acetate (diluent) |

Mixture B had an OH value of 171 mg KOH/g.

| Mixture C: | 90 g of polyester resin II |
| --- | --- |
| | 10 g of polyurethane dispersant resin from Example 4 |
| | 25 g of 2-methoxypropyl acetate (diluent) |

Mixture C had an OH value of 193 mg KOH/g

Mixtures A to C were mixed with commercially available polyisocyanate resins to form prototype clear coat compositions:
Isocyanate 1: Desmodur N 3600, 80% by weight solution in 2-methoxypropyl acetate
Isocyanate 2: Bayhydur N 3100, 70% by weight solution in 2-methoxypropyl acetate
Isocyanate 3: Bayhydur LS2150, 70% by weight solution in 2-methoxypropyl acetate In a glass jar an amount of polyester resin mixture corresponding to 0.1 mol OH was mixed with an amount of isocyanate corresponding to 0.1 mol NCO. While stirring with a spatula, demineralized water was added until a viscosity of 15 to 18 sec (DIN cup 4) was obtained.

The clear coat compositions were applied to glass panels by draw bar to yield films of about 60 μm thickness after drying. The clear coat compositions and the film properties are summarized in Table 2 below. The VOC is the theoretical amount of volatile organic compounds in the clear coat compositions. The Persoz hardness is expressed in seconds and was determined after 5 days of curing at ambient temperature. In all cases clear films were obtained.

TABLE 2

| Mixture | Isocyanate | Solid content in % by weight | VOC in g/l | Stability in hours | Persoz hardness |
| --- | --- | --- | --- | --- | --- |
| A | 1 | 45 | 200 | 2 | 190 |
| A | 2 | 42 | 250 | 2 | 114 |
| A | 3 | 40 | 260 | 4 | 276 |
| B | 1 | 45 | 230 | 1.5 | 299 |
| B | 2 | 42 | 280 | 1.5 | 200 |
| B | 3 | 40 | 280 | 3 | 320 |
| C | 1 | 45 | 200 | 1 | 150 |

The above results indicate that the dispersant resin according to the invention is useful for preparing aqueous compositions of dispersed hydrophobic resins.

Example 10

Use of the Dispersant Resins for Dispersing Pigments and Coating Compositions

The following pigments were tested:
Pigment 1: white—Kronos 2310 ex Kronos
Pigment 2: red—Irgazin DPP Red BO ex Ciba
Pigment 3: blue—Heliogene Blue L7101F ex BASF
Pigment 4: violet—Quindo Violet RV6926 ex Bayer Mixtures of these pigments with the above-described aqueous pigment dispersant resins solutions were prepared. The mixtures were dispersed in a Red Devil shaking apparatus. The results are summarized in Table 3 below. Furthermore, aqueous coating compositions suitable for base coats were prepared.

Pigment pastes with pigment 1 were prepared by milling the following components:
11.86 g Polyurethane dispersant resin solution as stated in Table 3
5.97 g Water
0.28 g Propylene glycol
2.40 g Commercially available dispersant
70.02 g Pigment 1
9.46 g Water Coating compositions with pigment 1 were prepared by mixing the following components:
20.80 g Aqueous binder dispersion comprising a polyacrylate and a polyurethane, solids content 42% by weight
7.35 g Aqueous polyacrylate dispersion, solids content 40% by weight
0.08 g Amine
13.09 g Water
3.17 g Cosolvent
0.30 g Clay thickener
14.62 g Water
1.06 g HEUR thickener
1.75 g Water
30.43 g Pigment paste with pigment 1
1.95 g Cosolvent
5.40 g Water Pigment pastes with pigment 2 were prepared by milling the following components:
33.51 g Polyurethane dispersant resin solution as stated in Table 3
1.44 g Propylene glycol
0.18 g Commercially available dispersant
0.45 g Defoamer
46.12 g Pigment 2
18.29 g Water Coating compositions with pigment 2 were prepared by mixing the following components:
19.94 g Aqueous binder dispersion comprising a polyacrylate and a polyurethane, solids content 42% by weight
7.05 g Aqueous polyacrylate dispersion, solids content 40% by weight
0.08 g Amine
12.56 g Water
3.04 g Cosolvent
0.29 g Clay thickener
14.02 g Water
1.02 g HEUR thickener
1.68 g Water
14.59 g Pigment paste with pigment 2
1.19 g Cosolvent
24.54 g Water Pigment pastes with pigment 3 were prepared by milling the following components:
22.19 g Polyurethane dispersant resin solution as stated in Table 3
1.42 g Propylene glycol
0.44 g Defoamer
35.19 g Pigment 3
40.76 g Water Coating compositions with pigment 3 were prepared by mixing the following components:
  25.21 g Aqueous binder dispersion comprising a polyacrylate and a polyurethane, solids content 42% by weight
  8.91 g Aqueous polyacrylate dispersion, solids content 40% by weight
  0.10 g Amine
  15.87 g Water
  3.84 g Cosolvent
  0.36 g Clay thickener
  17.72 g Water
  1.28 g HEUR thickener
  2.12 g Water
  11.13 g Pigment paste with pigment 3
  0.98 g Cosolvent
  12.48 g Water A pigment paste with pigment 4 was prepared by milling the following components:
  21.51 g Polyurethane dispersant resin solution as stated in Table 3
  1.50 g Propylene glycol
  4.00 Commercially available dispersant
  0.50 g Defoamer
  40.00 g Pigment 4
  32.49 g Water A coating composition with pigment 4 was prepared by mixing the following components:
  27.66 g Aqueous binder dispersion comprising a polyacrylate and a polyurethane, solids content 42% by weight
  9.78 g Aqueous polyacrylate dispersion, solids content 40% by weight
  0.11 g Amine
  17.43 g Water
  4.22 g Cosolvent
  0.40 g Clay thickener
  19.44 g Water
  1.41 g HEUR thickener
  2.33 g Water
  17.00 g Pigment paste with pigment 4

Table 3 summarizes the properties of the pigment pastes and the coating compositions thus prepared.

TABLE 3

| Pigment | Dispersant resin solution of | Flocculation paste | Fineness paste in μm | Transparency paste | Flocculation base coat |
|---|---|---|---|---|---|
| 1 | Example 1 | 7 | <10 | opaque | 6 |
| 2 | Example 1 | 8 | <10 | opaque | 8 |
| 3 | Example 1 | 10 | <10 | 32 | 8 |
| 1 | Example 2 | 8 | <10 | opaque | 6 |
| 2 | Example 2 | 9 | <10 | opaque | 8 |
| 3 | Example 2 | 10 | <10 | 33 | 8 |
| 2 | Example 3 | 10 | <10 | opaque | 8 |
| 3 | Example 3 | 10 | <10 | 34 | 8 |
| 2 | Example 4 | 10 | <10 | opaque | 8 |
| 3 | Example 4 | 10 | <10 | 36 | 8 |
| 2 | Example 5 | 8 | <10 | opaque | 6 |
| 3 | Example 5 | 8 | <10 | 35 | 6 |
| 2 | Example 6 | 8 | <10 | opaque | 6 |
| 3 | Example 6 | 10 | <10 | 34 | 6 |
| 2 | Example 7 | 8 | <10 | opaque | 6 |
| 3 | Example 7 | 10 | 14 | 33 | 6 |
| 2 | Example 8 | 8 | 18 | 9 | 8 |
| 4 | Example 8 | 10 | <10 | 67 | 9 |
| 2 | Example A | 3 | >50 | opaque | n.d. |
| 3 | Example A | 3 | >50 | 0 | n.d. |
| 1 | Example B | 4 | >25[1)] | opaque | 8 |
| 2 | Example B | 7 | <10 | opaque | 6 |
| 3 | Example B | 8 | <10 | 28 | 7 |

[1)]many lumps were present in the pigment paste

From the results given in Table 3 it can be inferred that the dispersant resins according to the invention of Examples 1 to 8 provide pigment pastes and base coat formulations having less flocculation and a better fineness than a pigment dispersion based on comparative dispersant resin from comparative Example A, having a low polyalkylene oxide content. Also with the difficult-to-disperse Quindo Violet (Pigment 4) excellent fineness and stability towards flocculation were obtained with the dispersant resin according to the invention.

In the case of transparent pigment Heliogene Blue (Pigment 3) a good transparency of the pigment paste was obtained when the pigment dispersant resin of the invention was used. When the comparative dispersant resin of Example A was used with this pigment, the pigment paste was not transparent. The dispersant resin of comparative Example B has no pendant hydrophobic side groups. With this resin a pigment paste of very poor quality was obtained in combination with a white pigment which generally is not difficult to disperse. The paste showed severe flocculation, contained many lumps, and the fineness of the paste was insufficient. With the dispersant resin according to the invention of Examples 1 and 2, these problems were not encountered in combination with white pigment.

Example 11

Preparation of a Polyurethane Dispersant Resin for a Pigment Preparation According to the Invention In a reaction vessel fitted with a stirrer, a thermocouple, a heating jacket, a reflux condenser, and a dropping funnel were placed 17.566 parts by weight (pbw) Jeffamine M1000. The reactor was purged with nitrogen and the contents were heated to 120° C. Then 4.083 pbw Cardura E10 were added to the reactor during 15 minutes and subsequently the contents of the reactor were heated to 130° C. and kept at this temperature for 4 hours. Thereafter, the contents of the reactor were cooled to 65° C.

Subsequently 1.604 pbw of melted 1,4-cyclohexanedimethanol were added to the reactor, followed by 4.948 pbw isophorone diisocyanate during 5 minutes. An exothermic reaction occurred. 2.790 pbw methylethyl ketone were added to the reactor, rinsing the pipes in the process. The contents of the reactor were heated to reflux, approximately 120° C., and kept under reflux for 2 hours. The reactor contents were cooled to 115° C., 0.006 pbw dibutyl tin dilaurate was added, and the reaction was continued for 2 more hours at 120° C. The isocyanate content was then below 0.1% by weight. The solvent methylethyl ketone was distilled off, first at atmospheric pressure. The pressure was gradually lowered during distillation to about 100 mbar to distill off essentially all methylethyl ketone.

The temperature of the reactor content was lowered to 100° C. and 71.499 pbw of water were added over a period of 2.5 hours. During the addition period the temperature of the reactor contents was gradually lowered to 30° C. Thereafter, the reactor contents were cooled to room temperature to obtain an aqueous solution of the dispersant resin.

The dispersant resin had a hydroxy value of 29.3 mg KOH/g, Mn of 4,150, alkylene oxide content of 62.2% by weight, ethylene oxide content of 51.5% by weight, all properties based on the non-volatile content of the dispersant resin.

Comparative Example C

Preparation of a polyurethane dispersant resin according to WO 97/19120 for a Comparative Pigment Preparation In a reaction vessel equipped as above were placed 368.8 g Tegomer D 3403, 507.5 g of oleyl alcohol, 456.9 g of a sulfosuccinate diol being the reaction product of 1 mol of maleic acid, 2 mol of Cardura® E 10, and 1 mol of NaHSO$_3$, and 196.0 g 2-butanone. The components were mixed and 420.5 g of isophorone diisocyanate were added via a dropping funnel. The mixture was heated to 120° C. and kept at this temperature for 2 hours. Then 0.5 g of dibutyl tin dilaurate was added and the reaction was continued for another 2 hours at 120° C. The temperature was then lowered to 90° C. and distillation was carried out at reduced pressure to remove essentially all volatile solvents. Next, 6,746 g water were added in 3 hours, during which period the mixture was allowed to cool to room temperature. An aqueous solution of a polyurethane dispersant resin was obtained. The ethylene oxide content of the polyurethane was 18.7% by weight.

Example 12

Preparation of a Pigment Preparation According to the Invention

A press cake of Ciba Irgazin DPP Red BO pigment containing 38% by weight of pigment was mixed with the dispersant resin solution of Example 11 and fluidized in a dissolver to give a liquid pigment slurry. The amount of dispersant resin solution was calculated so as to arrive at 17% by weight of dispersant resin, calculated on the sum of pigment and dispersant resin. The slurry was bead-milled on a 7-liter scale using an ECM-pilot mill and the pigment dispersion was given a total of 20 passes using 0.7-0.9 mm beads. The pigment slurry showed good milling characteristics. Fineness of grind was already reached after fluidization in the dissolver, indicating good wetting of the pigment. The viscosity was low due to the high water content of the slurry.

The samples were spray-dried in a Büchi mini spray-dryer with 132° C. inlet temperature and 85° C. outlet temperature. The flow was 0.2 kg/hr. No apparent clogging of the nozzle or pressure build-up was noticed. The powder was dried to around 1% residual moisture. The finished pigment preparation was a free-flowing dry powder.

Comparative Example D

Preparation of a Comparative Pigment Preparation

Example 12 was repeated, except that the dispersant resin solution of Example 11 was replaced by the dispersant resin solution of Comparative Example C. It was not possible to fluidize the pigment press cake, indicating insufficient pigment wetting. Even with additional dispersant resin solution a liquid pigment slurry suitable for milling could not be obtained.

Examples 13 to 16 and Comparative Examples E and F

Preparation of Coating Compositions

The pigment preparation of Example 12 was tested as stir-in pigment in two different water borne binder systems, Autowave 665 (Example 13) and Autowave 666 (Example 14). An IKA RW20 stirrer with 4 cm stirrer blade operating at 750-760 rpm was used for the tests. The pigment preparation of Example 12 was added under stirring and then maintained at the set speed for a total of 30 minutes. Sufficient pigment preparation was added to give coating compositions having a pigment content of 6.6% by weight. This is identical to the Autowave 357 toner used as reference (Comparative Example E). The finished coating compositions had excellent fineness of grind values and no particles were apparent in a Hegmann gauge test.

White reductions were prepared by mixing the coating compositions with white toner module Autowave 00.

Example 15

The coating composition of Example 13 was mixed with white toner module Autowave 00 so that the weight ratio of red pigment to white pigment in the resulting mixture was 50:50.

Example 16

The coating composition of Example 14 was mixed with white toner module Autowave 00 so that the weight ratio of red pigment to white pigment in the resulting mixture was 50:50.

Comparative Example F

The coating composition of comparative Example E was mixed with white toner module Autowave 00 so that the weight ratio of red pigment to white pigment in the resulting mixture was 50:50.

The coating compositions were applied on Leneta Form 2A opacity cards using a K-Control Coater (Bar 0.4, Speed 3) and left to dry at room temperature overnight.

The full tone paint properties of Examples 13 and 14 were considered excellent. In comparison with Comparative Example E, the full tone gloss was higher and the colour had a brighter, cleaner appearance. The white reduction chroma value was good.

The results are summarized in Table 4.

| Example | Stir-in properties | Gloss (60°) | Gloss (20°) | Chroma (C*) |
|---|---|---|---|---|
| 13 | excellent | 72.9 | 36.9 | 72.06 |
| 14 | excellent | 71.3 | 32.7 | 71.72 |
| E | not applicable | 64.2 | 14.4 | 69.45 |
| 15 | not applicable | 65.4 | 22.3 | 60.57 |
| 16 | not applicable | 71.0 | 29.7 | 60.75 |
| F | not applicable | 65.8 | 18.9 | 63.24 |

The invention claimed is:

1. A polyurethane dispersant resin comprising a polyurethane backbone having pendant hydrophilic polyalkylene oxide based side groups, the pendant side groups being linked to the polyurethane backbone via covalent bonds, and wherein the content of polyalkylene oxide in the polyurethane dispersant resin is at least 45% by weight, characterized in that the polyurethane backbone additionally has at least three pendant hydrophobic side groups which are linked to the polyurethane backbone via covalent bonds.

2. A polyurethane dispersant resin according to claim 1, characterized in that the content of polyalkylene oxide in the polyurethane dispersant resin is at most 80% by weight.

3. A polyurethane dispersant resin according to claim 1, characterized in that the polyalkylene oxide is based on ethylene oxide, propylene oxide, or mixtures thereof.

4. A polyurethane dispersant resin according to claim 1, characterized in that the pendant hydrophobic side groups comprise hydrocarbon groups having at least 4 carbon atoms.

5. A polyurethane dispersant resin according to claim 4, characterized in that the pendant hydrophobic side groups comprise hydrocarbon groups having at most 30 carbon atoms.

6. A polyurethane dispersant resin according to claim 4, characterized in that the hydrocarbon groups are branched.

7. A polyurethane dispersant resin according to claim 1, further comprising tertiary amine groups.

8. A polyurethane dispersant resin according to claim 7, characterized in that the tertiary amine groups are at least partially neutralized with an acidic neutralizing agent.

9. A polyurethane dispersant resin according to claim 1, characterized in that the polyurethane resin backbone is essentially free of hydrolyzable ester bonds.

10. A polyurethane dispersant resin according to claim 1, characterized in that the pendant hydrophilic polyalkylene oxide based side groups were introduced into the polyurethane by a compound having at least two isocyanate-reactive groups and a pendant polyalkylene oxide group.

11. A polyurethane dispersant resin according to claim 10, characterized in that the compound having at least two isocyanate-reactive groups and a pendant polyalkylene oxide group is a compound according to formula (I) or (II), or a mixture thereof,

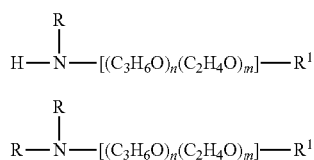

wherein R is the residue of a monoepoxide compound after reaction with an amine group, $R^1$ is selected from $C_1$ to $C_4$ alkyl groups, n is 0 to 25, m is 1 to 50, and $n+m \leq 50$.

12. A polyurethane dispersant resin according to claim 11, characterized in that R comprises a hydrocarbon group having 4 to 30 carbon atoms.

13. A composition comprising the polyurethane dispersant resin according to claim 1 and particles.

14. A composition according to claim 13, characterized in that the particles are pigment particles.

15. A composition according to claim 13, characterized in that the composition is liquid.

16. A composition according to claim 14, characterized in that the composition is solid.

17. A composition according to claim 16, characterized in that the composition comprises at least 35% by weight of at least one pigment and at most 65% by weight of polyurethane dispersant resin, calculated on the combined weight of pigment and polyurethane dispersant resin.

18. A composition according to claim 15, characterized in that the composition is an aqueous dispersion of a hydrophobic resin.

19. A composition according to claim 15, further comprising
a) at least one organic film-forming binder which is different from the polyurethane dispersant resin, and
b) at least one pigment,
wherein the composition is a coating composition.

20. A process for preparation of the composition according to claim 14 comprising the steps of subjecting to shear force a liquid mixture comprising a pigment, and at least one dispersing agent, characterized in that the polyurethane dispersant resin is used as the at least one dispersing agent.

21. A process according to claim 20, wherein the liquid mixture further comprises a liquid diluent.

22. A process for preparation of the composition according to claim 16 comprising the steps of
a) stirring a first composition comprising a pigment and a dispersing agent, to form a fluidized pigment slurry, and
b) drying the slurry, characterized in that the polyurethane dispersant resin is used as the dispersing agent.

23. A process according to claim 22, characterized in that the pigment is an organic pigment provided in the form of a press cake.

24. A process according to claim 23, characterized in that step b) is carried out by freeze-drying or spray-drying.

25. A method of preparing a stir-in pigment preparation, comprising adding the dispersant resin according to claim 1 to the pigment preparation.

26. A process according to claim 21, characterized in that the liquid diluent is water.

27. A process according to claim 22, further comprising the step of milling the slurry prior to step b), and wherein the first composition further comprises water or an organic diluent.

* * * * *

UNITED STATES PATENT AND TRADEMARK OFFICE
CERTIFICATE OF CORRECTION

PATENT NO. : 8,017,686 B2  
APPLICATION NO. : 12/064562  
DATED : September 13, 2011  
INVENTOR(S) : Buter et al.

Page 1 of 1

It is certified that error appears in the above-identified patent and that said Letters Patent is hereby corrected as shown below:

On the Title Page

(73) change "Akzo Nobel Coating International B.V., Arnhem (NL)" to
-- Akzo Nobel Coatings International B.V., Arnhem (NL) --

Signed and Sealed this
First Day of May, 2012

David J. Kappos
*Director of the United States Patent and Trademark Office*